United States Patent
Miyairi et al.

(10) Patent No.: US 7,754,160 B2
(45) Date of Patent: Jul. 13, 2010

(54) HONEYCOMB CATALYTIC BODY AND PROCESS FOR MANUFACTURING HONEYCOMB CATALYTIC BODY

(75) Inventors: Yukio Miyairi, Nagoya (JP); Toshio Yamada, Nagoya (JP)

(73) Assignee: NGK Insulators, Nagoya (JP)

( * ) Notice: Subject to any disclaimer, the term of this patent is extended or adjusted under 35 U.S.C. 154(b) by 741 days.

(21) Appl. No.: 11/511,461

(22) Filed: Aug. 29, 2006

(65) Prior Publication Data

US 2007/0049492 A1 Mar. 1, 2007

(30) Foreign Application Priority Data

Aug. 31, 2005 (JP) ............... 2005-250873

(51) Int. Cl.
*B01D 50/00* (2006.01)
(52) U.S. Cl. ..................... 422/180
(58) Field of Classification Search ......... 422/168, 422/177, 180, 211, 212; 502/325; 55/523
See application file for complete search history.

(56) References Cited

U.S. PATENT DOCUMENTS

2004/0053781 A1  3/2004  Okawara

FOREIGN PATENT DOCUMENTS

| EP | 1214973 A1 * | 6/2002 |
|---|---|---|
| JP | A 9-173866 | 7/1997 |
| JP | A 9-220423 | 8/1997 |
| JP | A 2002-221022 | 8/2002 |
| JP | A 2003-33664 | 2/2003 |
| JP | A 2004-105792 | 4/2004 |
| JP | A 2004-169636 | 6/2004 |

* cited by examiner

*Primary Examiner*—Tom Duong
(74) *Attorney, Agent, or Firm*—Oliff & Berridge, PLC

(57) ABSTRACT

A honeycomb catalyst body includes: porous partition walls having a large number of pores and disposed to form a plurality of cells communicating between two end faces, plugged portions disposed to plug each of the cells on one of the end faces, and catalyst layers loaded in layers on an inner surface of the cells and an inner surface of the pores and containing a noble metal. Mass ($M_c$) of the noble metal contained in the catalyst layer loaded on the inner surface of the cells and mass ($M_p$) of the noble metal contained in the catalyst layer loaded on the inner surface of the pores satisfy the relation of $(M_p)/(M_c) \geq 4$. The honeycomb catalyst body is excellent in purification efficiency, has low pressure loss, and is mountable even in a limited space.

11 Claims, 6 Drawing Sheets

US 7,754,160 B2

HONEYCOMB CATALYTIC BODY AND PROCESS FOR MANUFACTURING HONEYCOMB CATALYTIC BODY

BACKGROUND OF THE INVENTION AND RELATED ART STATEMENT

The present invention relates to a honeycomb catalyst body suitably usable for purifying target components such as carbon monoxide (CO), hydro carbonate (HC), nitrogen oxides ($NO_x$), and sulfur oxides ($SO_x$) contained in exhaust gas discharged from stationary engines for automobiles, construction machines, and industry and combustion apparatuses and to a method for manufacturing the honeycomb catalyst body.

At present, a honeycomb structured catalyst body (honeycomb catalyst body) is used for purifying exhaust gas discharged from various kinds of engines, or the like. As shown in FIG. 6, the honeycomb catalyst body has a structure where a catalyst layer 15 is loaded on a surface of partition walls 4 forming cells 3. In addition, as shown in FIGS. 4 and 5, when exhaust gas is purified by the use of the honeycomb catalyst body 60 (honeycomb structure 11), exhaust gas is allowed to flow into the cells 3 of the honeycomb catalyst body 60 from one end face 2a side to bring the exhaust gas into contact with the catalyst layer (not illustrated) on the surface of the partition walls 4, and then the exhaust gas is discharged outside from the other end face 2b (see JP-A-2003-33664).

In the case of purifying exhaust gas using such a honeycomb catalyst body, it is required to accelerate transmission of target components contained in exhaust gas from exhaust gas toward the catalyst layer on the surface of the partition walls as much as possible to enhance purification efficiency. In order to enhance purification efficiency, it is necessary to decrease a hydraulic diameter of the cells, to increase a surface area of the partition walls, and the like. Specifically, there is employed a method of increasing the cell number (cell density) per unit area, or the like.

Here, it is known that transmissibility of target components from exhaust gas toward the catalyst layer on the surface of the partition walls rises in inverse proportion to the square of a hydraulic diameter of the cells. Therefore, as the cell density is increased, the transmissibility of target components rises more. However, pressure loss also tends to increase in inverse proportion to the square of a hydraulic diameter of the cells. Therefore, there arises a problem that pressure loss rises in accordance with rise in transmissibility of target components.

Incidentally, the catalyst layer of the surface of the partition walls generally has a thickness of about several tens µm. Here, when the target components diffuse in the catalyst layer at an insufficient rate, purification efficiency of the honeycomb catalyst body tends to be lowered. This tendency is particularly notable under low-temperature conditions. Therefore, in order to enhance exhaust gas purification efficiency, it is necessary to not only increase the surface area of the catalyst layer, but also reduce thickness of the catalyst layer to raise a diffusion rate of the target components in the catalyst layer. Accordingly, when the cell density is increased, there arises a problem of increasing pressure loss though it has an advantage of increasing the surface area of the catalyst layer.

In order to reduce pressure loss together with enhancing exhaust gas purification efficiency, it is necessary to raise a flow rate of exhaust gas circulating in the honeycomb catalyst body together with increasing an inlet diameter of the honeycomb catalyst body. However, in the case that the honeycomb catalyst body is enlarged, it sometimes makes mounting difficult because of the limited mounting space regarding, for example, a honeycomb catalyst body to be mounted on a vehicle.

The present invention has been made in view of such problems of prior art and aims to provide a honeycomb catalyst body excellent in purification efficiency, having low pressure loss, and mountable even in a limited space and a method for manufacturing the honeycomb catalyst body.

In order to achieve the above aims, the present inventors zealously studied and, as a result, found out that the above aims can be achieved by loading a catalyst layer containing noble metals on an inner surface of the cells of the honeycomb structure and an inner surface of pores in the porous partition walls with specifying a range of mass ratio of the noble metals contained in each of the catalyst layers, which led to the completion of the present invention.

SUMMARY OF THE INVENTION

That is, according to the present invention, there is provided the following honeycomb catalyst body and method for manufacturing thereof.

[1] A honeycomb catalyst body comprising:
porous partition walls having a large number of pores and disposed to form a plurality of cells communicating between two end faces,
plugged portions disposed to plug each of the cells on one of the end faces, and
catalyst layers loaded in layers on an inner surface of the cells and an inner surface of the pores and containing a noble metal, the porous partition walls having a large number of catalyst-carrying pores where gas can pass;
wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(Mp)/(Mc) \geq 4$.

[2] A honeycomb catalyst body according to the above [1], wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(Mp)/(Mc) \geq 6$.

[3] A honeycomb catalyst body according to the above [1], wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(Mp)/(Mc) \geq 10$.

[4] A honeycomb catalyst body according to any one of the above [1] to [3], wherein the partition walls has a porosity of 55% or more in a state that the catalyst layer is loaded.

[5] A honeycomb catalyst body according to any one of the above [1] to [4], wherein the plugged portion has a porosity of 55% or more.

[6] A honeycomb catalyst body according to any one of the above [1] to [5], wherein a ratio (L/d) of a length (L) of the cells in the direction of communication to the equivalent diameter (d) is 0.3 or more and less than 0.75.

[7] A honeycomb catalyst body according to any one of the above [1] to [6], wherein a thickness of the partition walls is 0.3 to 0.43 mm, a cell density is 4 to 46.5 cells/$cm^2$, an average image maximum distance of the partition walls is 250 to 500 µm, and a porosity of the partition walls is 55 to 65%.

[8] A honeycomb catalyst body according to the above [7], wherein the partition walls has a porosity of 60 to 80% and a common logarithm standard deviation (pore diameter distribution σ) of pore diameter distribution in the partition walls is 0.2 to 0.6.

[9] A honeycomb catalyst body according to the above [1] or [2], wherein an average image maximum distance of the partition walls is 250 to 3000 µm.

[10] A method for manufacturing a honeycomb catalyst body using a honeycomb structure comprising:

porous partition walls having a large number of pores and disposed to form a plurality of cells communicating between two end faces, and plugged portions disposed to plug each of the cells on one of the end faces;

the method comprising the steps of:

applying catalyst slurry containing a noble metal on the inner surface of the cells and the inner surface of the pores of the honeycomb structure with applying supersonic waves to form a layer of the catalyst slurry, and drying the slurry to load the catalyst layer containing the noble metal on the inner surface of the cells and inner surface of the pores and to form a large number of catalyst-carrying pores where gas can pass;

wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(Mp)/(Mc) \geq 4$.

[11] A method for manufacturing a honeycomb catalyst body according to the above [10], wherein the catalyst slurry is thixotropic.

A honeycomb catalyst body of the present invention is effective in having excellent purification efficiency, low pressure loss, and mountability even in a limited space.

In addition, according to a method for manufacturing a honeycomb catalyst body, a honeycomb catalyst body having excellent purification efficiency and low pressure loss and mountable even in a limited space can be manufactured.

Figure 1:
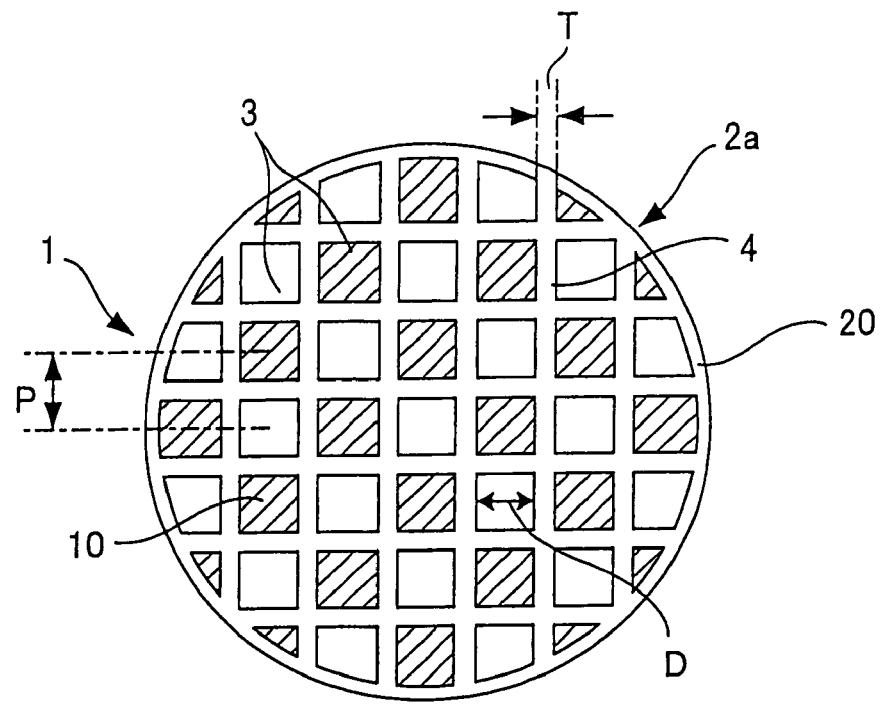
FIG. 1 is a front view schematically showing an embodiment of a honeycomb catalyst body of the present invention.

DESCRIPTION OF REFERENCE NUMERALS AND SYMBOLS 1, 11: honeycomb catalyst body, 2a, 2b: end face, 3: cell, 4: partition wall, 5, 15: catalyst layer, 10: plugged portion, 20: outer wall, 25: pore, 35: catalyst-layer carrying pore, 40: catalyst-carrying partition wall, 100: test piece, 105: remaining rib, D: cell hydraulic diameter, H: height of remaining rib, P: cell pitch, T, t: partition wall thickness, $T_c$: thickness of catalyst carrying partition wall, v: observed range (viewing field)

BEST MODE FOR CARRYING OUT THE INVENTION

A best mode for carrying out the present invention will hereinbelow be described. However, the present invention is by no means limited to the following embodiments, and it should be understood that the present invention includes inventions where a suitable change, improvement, or the like, is given to the following embodiment on the basis of those skilled in the art within the range of not deviating from the gist of the present invention.

Figure 2:
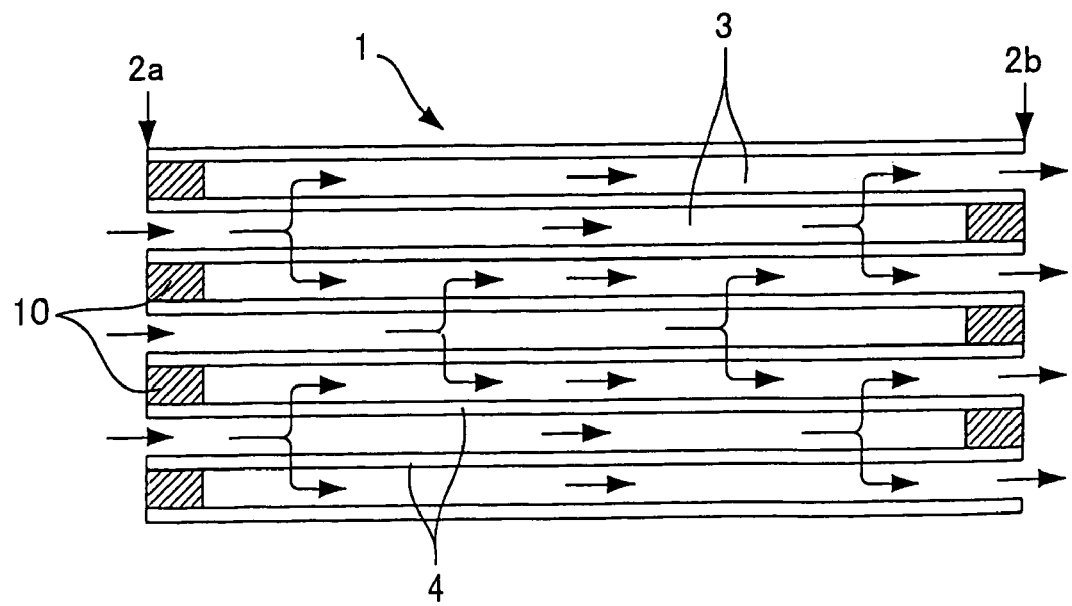
FIG. 2 is a cross-sectional view schematically showing an embodiment of a honeycomb catalyst body of the present invention.
Figure 3:
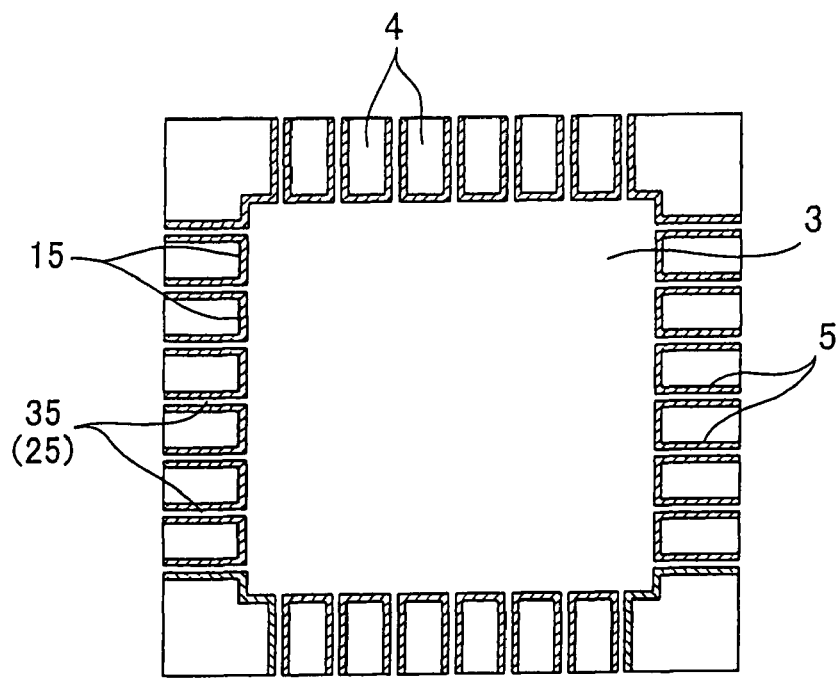
FIG. 3 is a partially enlarged view schematically showing an embodiment of a honeycomb catalyst body of the present invention.
Figure 4:
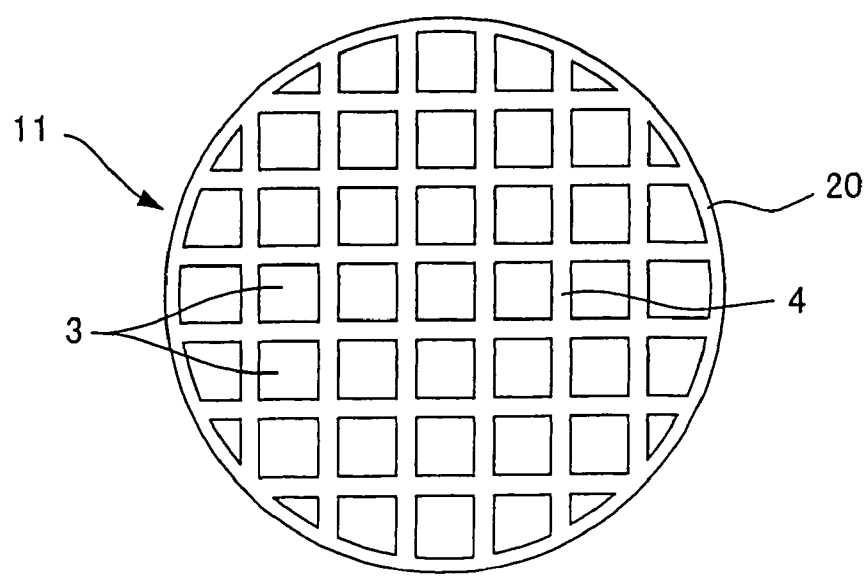
FIG. 4 is a front view schematically showing an embodiment of a conventional honeycomb catalyst body.
Figure 5:
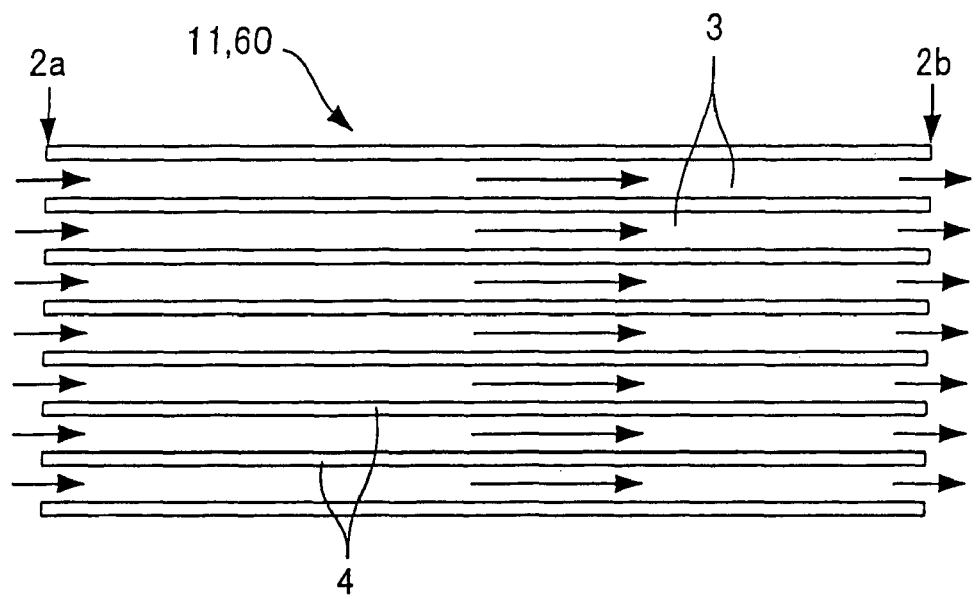
FIG. 5 is a cross-sectional view schematically showing an embodiment of a conventional honeycomb catalyst body.
Figure 6:
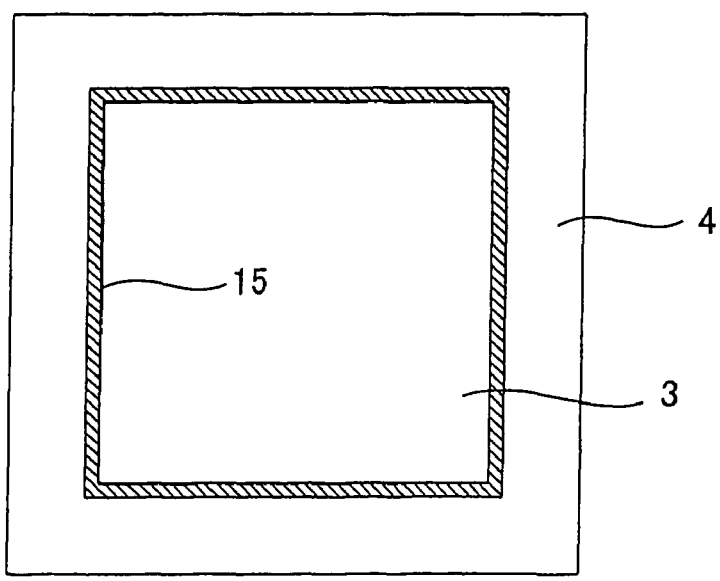
FIG. 6 is a partially enlarged view schematically showing an embodiment of a conventional honeycomb catalyst body.

FIG. 1 is a front view schematically showing an embodiment of a honeycomb catalyst body of the present invention. FIG. 2 is a cross-sectional view schematically showing an embodiment of a honeycomb catalyst body of the present invention. FIG. 3 is a partially enlarged view schematically showing an embodiment of a honeycomb catalyst body of the present invention. As shown in FIGS. 1 to 3, a honeycomb catalyst body 1 of the present embodiment is provided with porous partition walls 4 having a large number of pores, plugged portions 10, and catalyst layers 5 and 15 containing a noble metal and loaded on the inner surface of the pores 25 and the cells 3, respectively. The partition walls 4 are disposed so as to form a plurality of cells 3 communicating between two end faces 2a and 2b. In addition, the plugged portions 10 are disposed so as to plug the cells 3 on one of the end faces 2a and 2b of each cell. The catalyst layer 5 is loaded on the inner surface of the pores 25 in layer. A large number of catalyst-carrying pores 3 where a gas can pass are formed in the partition walls 4. The catalyst layer 15 is loaded on the inner surface of the cells 3 in layer. The catalyst layers 5 and 15 contain a noble metal. Incidentally, in FIG. 1, the symbols P, D, and T denote cell pitch, hydraulic diameter of a cell, and partition wall thickness, respectively.

Transmissibility of target components contained in exhaust gas when exhaust gas flows in the channel rises in inverse proportion to the square of a hydraulic diameter of the channel. Here, a hydraulic diameter of pores is by far smaller than that of a cell. Therefore, target components contained in exhaust gas can be transmitted more easily in the catalyst layer loaded on the inner surface of the pores 25 than in the catalyst layer 15 loaded on the inner surface of the cells. Therefore, exhaust gas purification efficiency can be enhanced by increasing the amount of the noble metal contained in the catalyst layer 5 loaded on the inner surface of the pores 25 in comparison with the amount of the noble metal contained in the catalyst layer 15 loaded on the inner surface of the cells 3.

In a honeycomb catalyst body 1 of the present embodiment, mass ($M_c$) of the noble metal contained in the catalyst layer 15 loaded on the inner surface of the cells 3 and mass ($M_p$) of the noble metal contained in the catalyst layer 5 loaded on the inner surface of the pores 25 satisfy the relation of $(M_p)/(M_c) \geqq 4$, preferably the relation of $(M_p)/(M_c) \geqq 6$, and more preferably the relation of $(M_p)/(M_c) \geqq 10$. That is, a honeycomb catalyst body 1 of the present embodiment is very excellent in exhaust gas purification efficiency because the amount of the noble metal contained in the catalyst layer 5 is larger than the amount of the noble metal contained in the catalyst layer 15.

Figure 7:
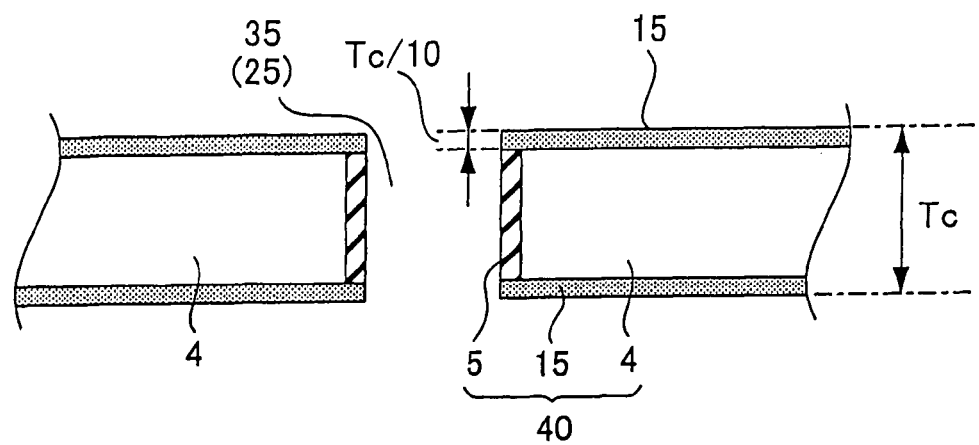
FIG. 7 is a partially enlarged view of FIG. 3.

The value of $(M_p)/(M_c)$ referred to in the present specification can be measured and calculated by analyzing elements regarding a cross-section of a honeycomb catalyst body taken perpendicularly to the cell communicating direction, and analyzing an image showing the results of the analysis of the elements. Incidentally, as shown in FIG. 7, the catalyst layer 15 loaded on the inner surface of the cells means the region (region represented by $T_c/10$) up to the position of 1/10 in depth of the thickness of the catalyst-carrying partition walls 40 (thickness $T_c$ of the catalyst-carrying partition walls) from the surface in the catalyst-carrying partition walls 40 provided with partition walls 4 and catalyst layers 5, 15.

Example of the noble metal contained in each of the catalyst layers 5, 15 include noble metals generally contained in catalysts such as a three way catalyst for purifying exhaust gas from a gasoline engine, an oxidation catalyst for purifying exhaust gas from a gasoline engine or a diesel engine, and a SCR catalyst for selectively reducing $NO_x$. Specifically, Pt, Rh, or Pd, or a combination thereof can suitably be used. Incidentally, in the case that two or more kinds of noble metals are used, "mass of the noble metals contained in a catalyst layer" means the sum of the masses of the two or more kinds of noble metals".

In addition, the cell hydraulic diameter D (m) and the permeability ($m^2$) of a honeycomb catalyst body 1 preferably satisfies the relation of (cell hydraulic diameter)$^2$/(permeability)=$2 \times 10^3$ or more and less than $6 \times 10^5$, more preferably satisfies the relation of (cell hydraulic diameter)$^2$/(permeability)=$5 \times 10^3$ to $1 \times 10^5$, and particularly preferably satisfies the relation of (cell hydraulic diameter)$^2$/(permeability) =$1 \times 10^4$ to $5 \times 10^4$.

Pressure loss (cell circulation pressure loss) generated when gas circulates in cells is in inverse proportion to the square of a hydraulic diameter of the cells. A ratio (partition wall passing pressure loss)/(cell circulation pressure loss) of pressure loss (partition wall passing pressure loss) generated when gas passes through partition walls to pressure loss (cell circulation pressure loss) generated when gas circulates in cells is in proportion to (cell hydraulic diameter)$^2$/(permeability). It is preferable that (cell hydraulic diameter)$^2$/(permeability) is $2 \times 10^3$ or more because gas can easily flow uniformly over the entire range of the partition walls 4. On the other hand, it is preferable that (cell hydraulic diameter)$^2$/(permeability) is less than $6 \times 10^5$ because pressure loss of the whole honeycomb catalyst body 1 hardly increases.

Incidentally, "permeability" in the present specification means a value of physical properties calculated from the following formula (1) and a value serving as an index representing a passing resistance when a predetermined gas passes an object (partition wall). In the following formula (1), C, F, T, V, D, and P denote permeability ($m^2$), gas flow rate ($cm^3/s$), sample thickness (cm), gas viscosity (dynes·sec/$cm^2$), sample diameter (cm), and gas pressure (PSI), respectively. In addition, with respect to the numerical values in the following formula (1), 13.839 (PSI) equals 1 (atm), and 68947.6 (dynes·sec/$cm^2$) equals 1 (PSI).

[Formula 1]

$$C=[8FTV/\{\pi D^2(P^2-13.839^2)/13.839 \times 68947.6\}] \times 10^{-4} \quad (1)$$

Figure 9:
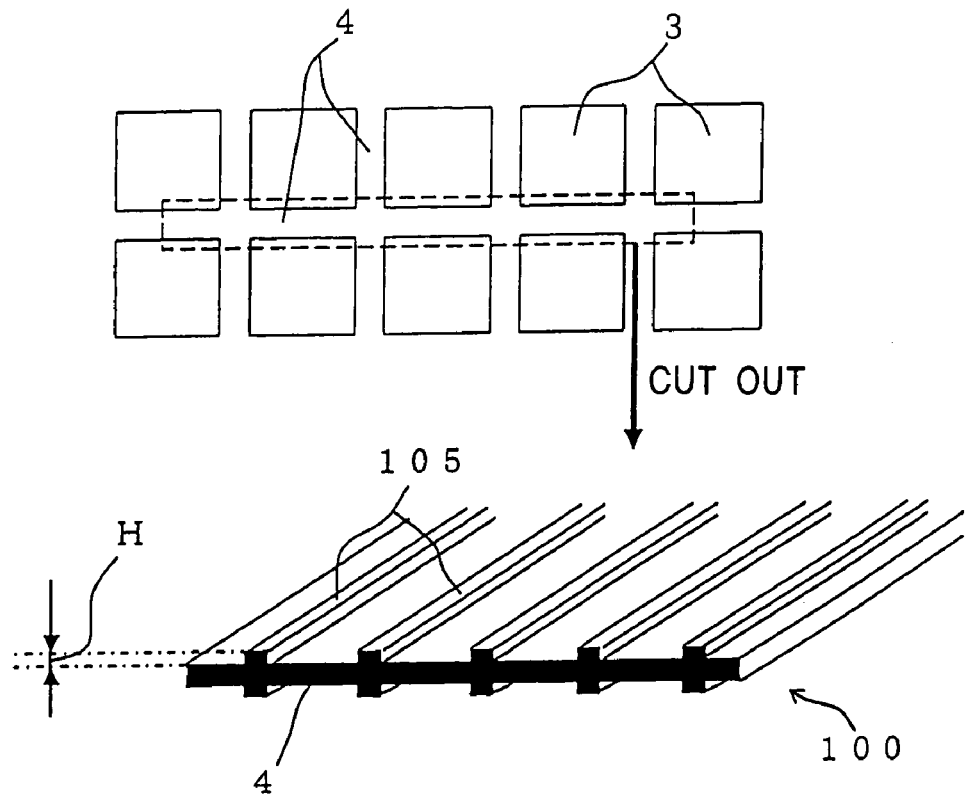
FIG. 9 is a schematic view explaining about a test piece used for measurement of permeability.

FIG. 9 is a schematic view explaining about a test piece used for measurement of permeability. As shown in FIG. 9, in the first place, a test piece 100 is cut out from a honeycomb catalyst body in the state that a part (remaining rib 105) of the partition walls connected with a partition wall 4 is left so that the remaining rib has a height of 0.2 mm. The test piece 100 may have a shape of a square plane or a disc. Air at room temperature is sent in the test piece 100, and permeability at that time is calculated by the above formula (1). It is desirable to use a fluidity seal such as grease lest air should leak from a gap between the test piece 100 and a seal formed by the remaining rib 105. In addition, an air flow rate is adjusted so that flow velocity upon passing partition walls is 0.1 to 1 cm/sec on a calculation, and the result of calculation with this air flow rate is employed.

A honeycomb catalyst body 1 of the present embodiment has a density of the cells 3 (cell density) of preferably 0.25 to 46.5 cells/$cm^2$ (1.61 to 300 cpsi), more preferably 1.55 to 15.5 cells/$cm^2$ (10 to 100 cpsi), and particularly preferably 1.55 to 12.4 cells/$cm^2$ (10 to 80 cpsi). When the cell density is below 0.25 cells/$cm^2$, contact efficiency with exhaust gas tends to be insufficient. On the other hand, when the cell density is above 46.5 cells/$cm^2$, pressure loss tends to increase. Incidentally, "cpsi" is an abbreviation of "cells per square inch" and a unit representing the number of cells per one square inch. 10 cpsi almost equals to 1.55 cells/$cm^2$.

Thickness of the partition walls 4 (partition wall thickness T) is preferably 0.15 to 7 mm (5.9 to 276 mil), more preferably 0.4 to 2 mm (15.7 to 78.7 mil) and particularly preferably 0.7 to 1.5 mm (27.6 to 59 mil). When the partition wall thickness T is below 0.15 mm, strength is insufficient, and thermal shock resistance is sometimes deteriorated. On the other hand, when the partition wall thickness T is above 7 mm, pressure loss tends to increase. Incidentally, 1 mil is one thousandth of an inch, which is about 0.025 mm.

An average image maximum distance of the partition walls 4 in the state that the catalyst layer 5 is loaded thereon, that is, in the state that the catalyst-carrying pores 35 are formed is preferably 40 to 3000 μm, more preferably 50 to 500 μm, and particularly preferably above 250 to 500 μm or less. When the average image maximum distance is below 40 μm, particulates such as carbon particulates contained in exhaust gas discharged from, for example, a diesel engine can easily be trapped, which tends to cause rise in pressure loss. On the other hand, when the average image maximum distance is above 3000 μm, it tends to be difficult to sufficiently secure a contact area between exhaust gas and the catalyst layer. Incidentally, "average image maximum distance" is a value of physical properties measured by image analysis. Concretely, a SEM photograph of a cross-section of a partition wall is observed for at least 20 viewing fields with respect to a viewing field of length×width=t×t in the case that the partition wall thickness is defined as "t". Next, the maximum linear distance in a gap is measured within each of the viewing fields observed above, and the average value of the maximum linear distances measured with respect to all the viewing fields is determined as "average image maximum distance".

Figure 10:
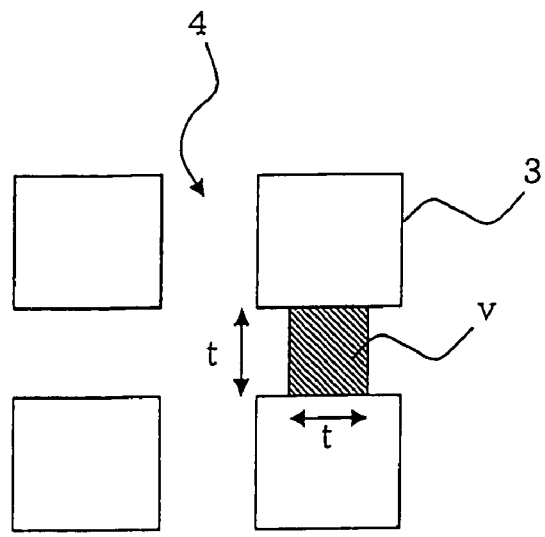
FIG. 10 is a plan view schematically showing a state of enlarging a part of an end face of an embodiment of a honeycomb structure of the present invention.
Figure 11:
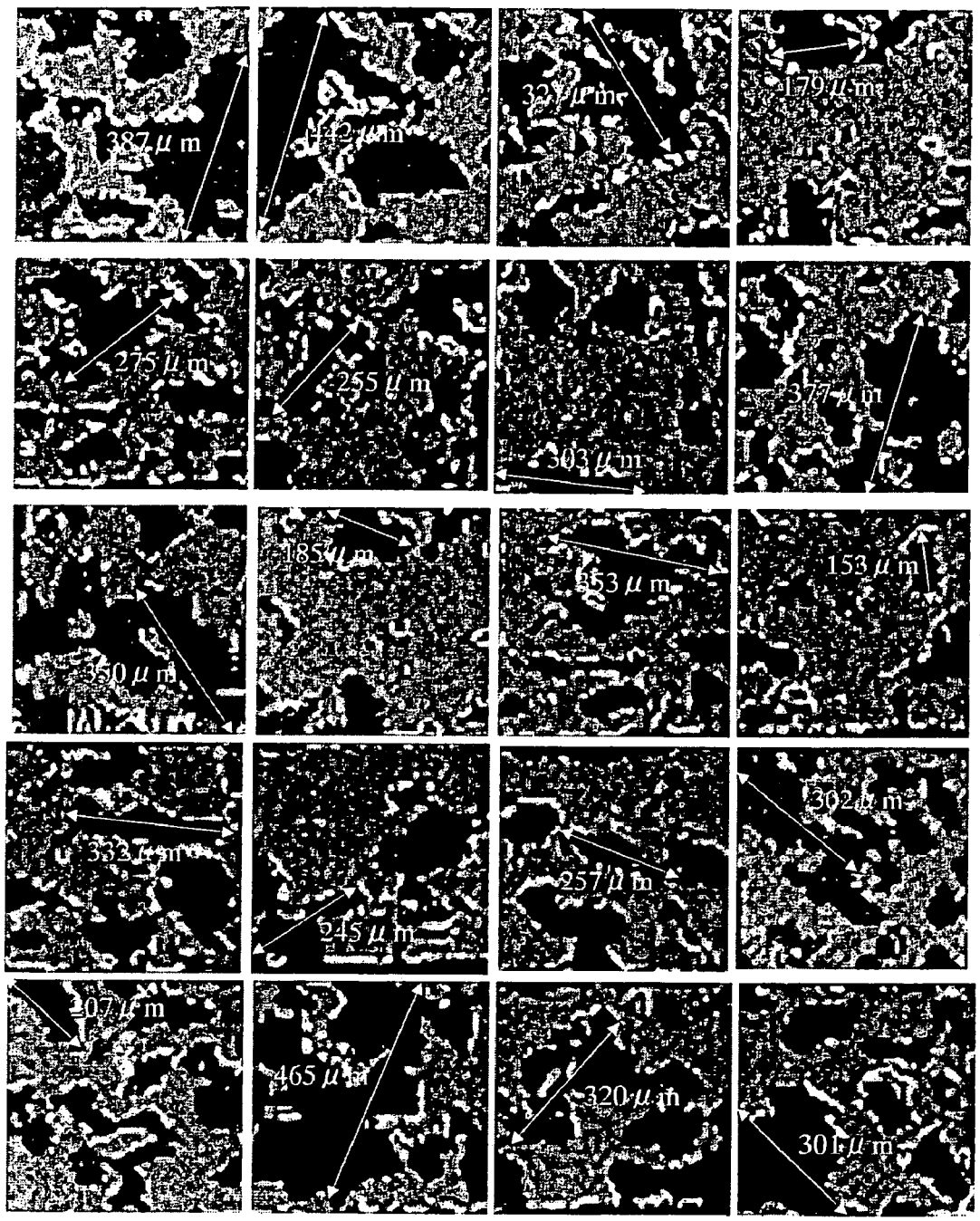
FIG. 11 is a SEM photograph of an embodiment of a honeycomb structure of the present invention.

For example, in a plan view where a part of an end face of a honeycomb structure is enlarged shown in FIG. 10, a region of t×t of a partition wall 4 is defined as one observed range (viewing field) v, SEM photographs are taken with respect to 20 viewing fields, and they are subjected to image analysis. Then, as shown in FIG. 11, the maximum linear distance is measured in each of the SEM photographs taken for 20 viewing fields to obtain the average value. In SEM photographs of 20 viewing fields shown in FIG. 11, the maximum linear distances are 387 μm, 422 μm, 327 μm, 179 μm, 275 μm, 255 μm, 303 μm, 377 μm, 350 μm, 185 μm, 353 μm, 153 μm, 332 μm, 245 μm, 257 μm, 302 μm, 207 μm, 465 μm, 320 μm, and 301 μm from the top left toward right and from the top to the bottom. In this case, the average image maximum distance is 301 μm.

Incidentally, the SEM photographs shown in FIG. 11 were of 50 magnifications. For the image analysis, there can be used a commercial image analysis software, for example, Paint Shop ProX (trade name) produced by Corel Corporation. Any magnification of the SEM photograph can be employed as long as distinct images can be obtained, and, arbitrary magnifications of, for example, 10 to 1000 magnifications may be selected.

The partition walls 4 preferably has a porosity of 55% or more in the state that the catalyst layer 5 is loaded thereon, that is, in the state that the catalyst-carrying pores 35 are formed. Incidentally, "porosity" in the present specification means a value of physical properties measured by image analysis. Concretely, a SEM photograph of a cross-section of a partition wall is observed for at least 5 viewing fields with respect to a viewing field of length×width=t×t in the case that the partition wall thickness is defined as "t". A gap area percentage is measured within each of the viewing fields observed above, and the average value of the values obtained by (the gap area percentage)$^{3/2}$ with respect to all the viewing fields is determined as "porosity".

A common logarithm standard deviation (pore diameter distribution σ) of pore diameter distribution in the partition walls is preferably 0.1 to 0.6, and more preferably 0.2 to 0.6. When the pore diameter distribution σ is below 0.1, flow velocity upon passing partition walls increases, and purification performance tends to deteriorate. On the other hand, when the pore diameter distribution σ is above 0.6, gas passes only through large pores, and purification performance tends to deteriorate. In the case of introducing a "common logarithm standard deviation of pore diameter distribution", a value obtained by measuring with a mercury porosimeter as the "pore diameter distribution". With respect to the obtained pore diameter distribution, a common logarithm standard deviation (sd in the following formula (5): standard deviation) is obtained by the use of the following formulae (2) to (5). Incidentally, in a differential pore volume shown by "f" in the following formulae (3) and (4), provided that, for example, a pore volume of pores having a pore diameter of Dp1 or less (accumulation of pore diameters of 0 to Dp1) is V1 and that a pore volume of pores having a pore diameter of Dp2 or less (accumulation of pore diameters of 0 to Dp2) is V2, the differential pore volume f2 is a value shown by f2=V2−V1. In the following formulae (2) to (5), "Dp", "f", "x", "xav", "s$^2$", and "sd" denote pore diameter (μm), differential pore volume (mL/g), common logarithm of a pore diameter Dp, average value of x, dispersion of x, and standard deviation of x (common logarithm standard deviation of pore diameter distribution), respectively. In addition, "s" in the following formulae and Table 3 denotes pore diameter distribution σ.

[Formula 2]

$$x = \log Dp \quad (2)$$

$$xav = \Sigma fx/\Sigma f \quad (3)$$

$$s^2 = \Sigma x^2 f/\Sigma f - xav^2 \quad (4)$$

$$sd = \sqrt{s2} \quad (5)$$

A porosity of the plugged portion 10 of a honeycomb catalyst body 1 of the present embodiment is preferably 55% or more, more preferably 55 to 70%, and particularly preferably 55 to 65%. By controlling the porosity of the plugged portion 10 to be 55% or more, heat capacity can be reduced, and time until the catalyst reaches active temperature can be shortened. Therefore, purification performance during this period can be enhanced.

In a honeycomb catalyst body 1 of the present embodiment, a ratio (L/d) of a length (hereinbelow sometimes referred to as "whole length L") of the cells in the direction of communication to the equivalent diameter (d) is preferably 0.3 or more and less than 0.75, more preferably 0.3 to 0.5, and particularly preferably 0.3 to 0.4. When the whole length L is too long (when the ratio of L/d is too high), flow velocity upon passing partition walls is not uniform in the axial direction of the carrier to generate distribution. That is, a large amount of exhaust gas flows through partition walls in the vicinity of the outlet, and load is applied only on the catalyst in the portion, and thereby, sometimes, the catalyst coated on the other portions is not used effectively to be in vain. On the other hand, when L/d is too low, the ratio of the length of a plugged portion to the whole length L (percentage) increases. Since this increase means that a weight ratio of the portion which cannot be used for catalyst-carrying increases, warming ability of the catalyst is decreased, and purification performance is prone to deteriorate. Therefore, by specifying the ratio of L/d within the above range, distribution of flow velocity upon passing partition walls becomes uniform, and therefore the whole partition walls can effectively be used to enhance purification performance. Incidentally, the equivalent diameter d is a value obtained by "4×cross-sectional area/length of outer periphery of cross-section". Here, a "cross-sectional area" is an area of a cross-section taken along a direction of a diameter on a plane perpendicular to a cell communicating direction. A "length of outer periphery of cross-section" means a length of outer periphery of the above cross-section.

In addition, in a honeycomb catalyst body 1 of the present embodiment, a cross-section taken along a direction of a diameter on a plane perpendicular to a cell communicating direction preferably has a shape suitable for an inner shape of an exhaust gas system for installation. Examples of the shape include a circle, an oval, an ellipse, a trapezoid, a triangle, a rectangle, a hexagon, and an asymmetric special shape. Of these, a circle, an oval, or an ellipse is preferably employed.

Next, a method for manufacturing a honeycomb catalyst body of the present embodiment will be described. A honeycomb catalyst body 1 of the present embodiment can be manufactured by applying catalyst slurry containing a noble metal on a honeycomb structure having a predetermined shape with applying supersonic waves to form a coat layer of catalyst slurry on the inner surface of the cells 3 and the inner surface of the pore 25 and by drying the slurry. The details will hereinbelow be described.

A honeycomb structure serving as a catalyst carrier is provided with porous partition walls 4 having a large number of pores and disposed so as to form a plurality of cells communicating between two end faces 2a and 2b and plugged portions 10 arranged so as to plug the cells 3 on one of the end faces 2a and 2b. Suitable examples of a material constituting the honeycomb structure include a material containing ceramic as the main component and a sintered metal. In the case that the honeycomb structure is constituted by material containing ceramic as the main component, suitable examples of the ceramic include silicon carbide, cordierite, alumina titanate, sialon, mullite, silicon carbide, zirconium phosphate, zirconia, titania, alumina, silica, and a combination thereof. Particularly suitable are ceramics such as silicon carbide, cordierite, mullite, silicon nitride, and alumina from the viewpoint of alkali resistant properties. Of these, oxide ceramics are preferable also in respect of costs.

In a honeycomb structure, the cells preferably has a thermal expansion coefficient of below $1.0 \times 10^{-6}/°C.$, preferably 0 to $0.8 \times 10^{-6}/°C.$, and more preferably 0 to $0.5 \times 10^{-6}/°C.$ in a cell communicating direction at 40 to 800° C. When the thermal expansion coefficient in a cell communicating direction at 40 to 800° C. is below $1.0\times10^{-6}$/° C., thermal stress upon being exposed to exhaust gas can be suppressed to be low, and fracture due to thermal stress can be inhibited.

A honeycomb structure can be produced according to a manufacturing method in accordance with a conventionally known method for manufacturing a diesel particulate filter (DPF). However, in a honeycomb catalyst body of the present invention where a catalyst is carried on the honeycomb structure, a large number of catalyst-carrying pores where gas can pass are formed in the partition walls. Therefore, for example, in the case that chemical composition of material is suitably adjusted and that a pore former is used to give a porous structure, a pore structure of the partition walls can be adjusted by suitably adjusting kind, particle diameter, addition amount, and the like, of the pore former to be used.

Catalyst slurry can be prepared according to a conventionally known method. Incidentally, the catalyst slurry is preferably thixotropic to allow the catalyst slurry to penetrate into the inside of the pores of the honeycomb structure and to easily form a coat layer on the inner surfaces of the pores. Whether catalyst slurry is thixotropic or not can be judged by the size of the thixotropy index. Incidentally, the thixotropy index of catalyst slurry can be adjusted by adding a suitable amount of thixotropy agent such as such as aerosil, bentonite, hydrocastor oil, calcium carbonate, and aluminum silicate.

Catalyst slurry is applied on the inner surface of the cells and the inner surface of the pores with applying supersonic waves to the honeycomb structure and/or the catalyst slurry to form a layer of the catalyst slurry. By applying catalyst slurry with lowering a viscosity of the slurry by vibrations due to the supersonic waves, catalyst slurry can penetrate into the inside of the pores of the honeycomb structure, and a layer of the catalyst slurry can be formed on the inner surface of the pores. Incidentally, catalyst slurry may be applied by a method such as a suction method. Then, a honeycomb structure having a layer of catalyst slurry formed thereon is dried at room temperature or under heating conditions to manufacture a honeycomb catalyst body of the present embodiment, where mass ($M_c$) of a noble metal contained in the catalyst layer loaded on the inner surface of the cells and mass ($M_p$) of a noble metal contained in the catalyst layer loaded on the inner surface of the pores satisfy the relation of $(M_p)/(M_c) \geq 4$.

Incidentally, though surplus slurry is removed by pressurized air or the like after catalyst slurry is applied by a suction method or the like, a layer of catalyst slurry may be formed on the inner surfaces of the pores by applying vibration on a honeycomb structure before the removal. With regard to thixotropy of the catalyst slurry, the optimum conditions may be selected in consideration of strength of vibrations applied, frequency, time, etc. Viscosity of the catalyst slurry may be lowered, by applying vibrations, by 30% or more in comparison with that in the case without vibrations though it depends on vibration conditions. However, when the viscosity lowers by 85% or more, the catalyst slurry flows down, and it is prone to be unfavorable in forming a layer of catalyst slurry. Incidentally, the viscosity was measured under temperature conditions in an actual operation step using a BL type viscometer produced by Toki Sangyo Co., Ltd.

EXAMPLE

The present invention will hereinbelow be described in more detail on the basis of Examples. However, the present invention is by no means limited to these Examples.

[Average image maximum distance]: Pore diameters were measured by image analysis, and the average image maximum distance was calculated. Concretely, a SEM photograph of a cross-section of a partition wall was observed for at least 20 viewing fields with respect to a viewing field of length×width=t×t in the case that the partition wall thickness was defined as "t". Next, the maximum linear distance in a gap was measured within each of the viewing fields observed above, and the average value of the maximum linear distances measured with respect to all the viewing fields was determined as the "average image maximum distance".

[Standard deviation ($\sigma$) of pore diameter distribution]: A pore diameter distribution was measured by the use of a mercury porosimeter (Trade name: Auto Pore III, type 9405, produced by Micromeritics Instruments Corp.), and the standard deviation of the pore diameter distribution (pore diameter distribution $\sigma$) was calculated.

[Porosity]: Porosity was measured by image analysis. Concretely, a SEM photograph of a cross-section of a partition wall was observed for at least 5 viewing fields with respect to a viewing field of length×width=t ×t in the case that the partition wall thickness was defined as "t". A gap area percentage was measured within each of the viewing fields observed above, and the average value of the values obtained by (the gap area percentage)$^{3/2}$ with respect to all the viewing fields was determined as "porosity".

[Permeability]: A part of partition walls was taken out and machined to obtain a sample without unevenness. This sample was sandwiched from the top and the bottom with a sample holder having a diameter of 20 mm lest gas should leak. Then, a certain gas pressure was applied to the sample to give a pressure of 1 atm on the downstream side of the sample, and gas was sent into the sample. At this time, permeability was calculated on the basis of the following formula (1) with respect to the gas passed through the sample. Incidentally, in the formula (1), C, F, T, V, D, and P denote permeability (m$^2$), gas flow rate (cm$^3$/s), sample thickness (cm), gas viscosity (dynes·sec/cm$^2$), sample diameter (cm), and gas pressure (PSI), respectively. In addition, with respect to the numerical values in the following formula (1), 13.839 (PSI) equals 1 (atm), and 68947.6 (dynes·sec/cm$^2$) equals 1 (PSI). Incidentally, there was used an apparatus such as Capillary Flow Pormeter (trade name), Type 1100 AEX, produced by Porous Materials, Inc., upon measurement.

[Formula 3]

$$C=[8FTV/\{\pi D^2(P^2-13.839^2)/13.839\times 68947.6\}]\times 10^{-4} \quad (1)$$

[Purification Rate]: Cumbustion gas containing 7 vol % of oxygen, 10 vol % of steam, 10 vol % of carbon dioxide, 20 (carbon molar number) ppm of hydrocarbon, and the rest of nitrogen was sent into a honeycomb structure or honeycomb catalyst body at a temperature of 200° C. at a space velocity (SV) of 100000/h. The purification rate (%) was calculated from a hydrocarbon content of the combustion gas before and after being sent into the honeycomb structure or honeycomb catalyst body.

[Purificaton Index]: The above purification rate (standard purification rate (%)) was calculated by the use of a honeycomb catalyst body to be compared, and a purification index (%) was calculated as a rate with respect to the standard purification rate. Here, "purification index=200%" means that it is twice the purification rate of the honeycomb structure to be compared.

Mass ($M_p$) of the noble metal contained in the catalyst layer loaded on the inner surface of the pores and mass ($M_c$) of the noble metal contained in the catalyst layer loaded on the inner surface of the cells were measured by analyzing elements regarding a cross-section of a honeycomb catalyst body taken in a direction of a diameter perpendicular to the cell communicating direction to obtain a ratio of $(M_p)/(M_c)$.

(Preparation of Slurry)

A dinitrodiamine platinum solution was used as a raw material. The catalyst slurry containing platinum (Pt) as a noble metal and further containing active alumina and ceria as an oxygen adsorbent was prepared by mixing 70 parts of γ-alumina powder carrying platinum (Pt) with 30 parts of ceria to obtain a mixture and subjecting the mixture to wet grinding.

Examples 1 to 14, Comparative Examples 1 to 5

To 100 parts by mass of a cordierite forming raw material prepared by combining some selected from talc, kaolin, calcined kaolin, alumina, calcium hydroxide, and silica at a predetermined ratio to have the chemical composition of 42 to 56% by mass of $SiO_2$, 0 to 45% by mass of $Al_2O_3$, and 12 to 16% by mass of MgO, were added 12 to 25 parts by mass of graphite as a pore former and 5 to 15 parts by mass of a synthetic resin. To the mixture were further added an appropriate amount of a methyl cellulose and a surfactant. Then, water was further added to the mixture, and the mixture was kneaded to prepare clay. The clay was subjected to vacuum degassing and subsequently to extrusion forming to obtain honeycomb formed bodies. After the honeycomb formed bodies were dried, they were fired at the highest temperature of 1400 to 1430° C. to obtain honeycomb fired bodies. By plugging one of the end portions of each cell of the obtained honeycomb fired bodies to give a checkerwise pattern and firing the honeycomb fired bodies again, nine honeycomb structures each having a pore structure of partition walls shown in Table 1, a diameter of 144 mm, and the entire length of 152 mm were manufactured. Incidentally, a pore structure of the partition walls was adjusted by suitably adjusting chemical composition of the cordierite forming raw material, particle size of the pore former, and amount of the pore former added. In addition, the plugged portion had a depth of plugging of 10 mm from an end face.

A coat layer of catalyst slurry prepared above was formed on the inner surfaces of the partition walls and the inner surfaces of the pores of the honeycomb structures manufactured above by a suction method. At this time, vibrations by supersonic waves were given to the honeycomb structures. Then, by heating and drying, honeycomb catalyst bodies (Examples 1 to 14, Comparative Examples 1 to 5) each having a pore structure of the partition walls (with a catalyst layer) shown in Tables 1 and 2 were manufactured. Incidentally, an amount of noble metal (Pt) per 1 liter of a honeycomb structure (carrier) was 2 g. In addition, a coated amount of catalyst slurry per 1 liter of a honeycomb structure (carrier) was 100 g.

Figure 8:
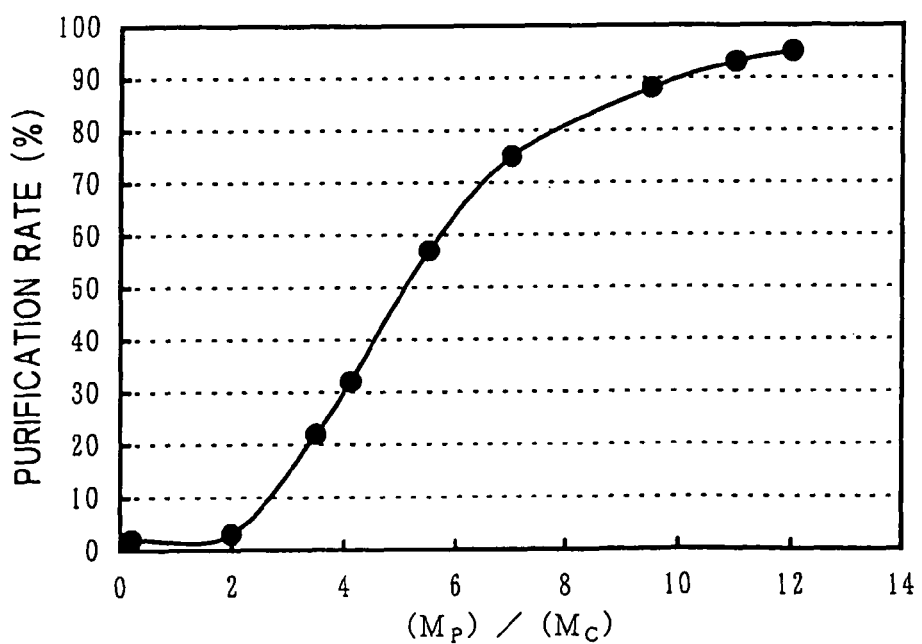
FIG. 8 is a chart showing plotted purification rates with respect to $(M_p)/(M_c)$.

A purification rate of each of the honeycomb catalyst bodies (Examples 1 to 14, Comparative Examples 1 to 5) was measured and calculated. The results are shown in Tables 1 and 2. In addition, a chart showing plotted purification rates with respect to $(M_p)/(M_c)$ is shown in FIG. 8.

TABLE 1

(a)

| | Cell density | | Cell pitch (mm) | Partition wall thickness | | Cell hydraulic diameter | Average image maximum distance | Porosity (%) |
|---|---|---|---|---|---|---|---|---|
| | (cells/cm²) | (cpsi) | | (mm) | (mil) | (m) | (μm) | |
| Example 1 | 12.40 | 80 | 2.84 | 0.508 | 20 | 0.0023 | 82 | 38 |
| Example 2 | 12.40 | 80 | 2.84 | 0.508 | 20 | 0.0023 | 83 | 40 |
| Example 3 | 12.40 | 80 | 2.84 | 0.508 | 20 | 0.0023 | 85 | 41 |
| Example 4 | 12.40 | 80 | 2.84 | 0.508 | 20 | 0.0023 | 86 | 42 |
| Example 5 | 12.40 | 80 | 2.84 | 0.508 | 20 | 0.0023 | 88 | 43 |
| Example 6 | 12.40 | 80 | 2.84 | 0.508 | 20 | 0.0023 | 91 | 45 |
| Example 7 | 15.5 | 100 | 2.54 | 0.4318 | 17 | 0.0021 | 250 | 60 |
| Example 8 | 15.5 | 100 | 2.54 | 0.4318 | 17 | 0.0021 | 260 | 63 |
| Example 9 | 15.5 | 100 | 2.54 | 0.4318 | 17 | 0.0021 | 270 | 64 |
| Example 10 | 15.5 | 100 | 2.54 | 0.4318 | 17 | 0.0021 | 290 | 70 |
| Example 11 | 15.5 | 100 | 2.54 | 0.4318 | 17 | 0.0021 | 200 | 65 |
| Example 12 | 15.5 | 100 | 2.54 | 0.4318 | 17 | 0.0021 | 600 | 65 |
| Comp.Ex.1 | 12.40 | 80 | 2.84 | 0.508 | 20 | 0.0023 | 92 | 46 |
| Comp.Ex.2 | 12.40 | 80 | 2.84 | 0.508 | 20 | 0.0023 | 94 | 47 |
| Comp.Ex.3 | 12.40 | 80 | 2.84 | 0.508 | 20 | 0.0023 | 95 | 48 |

(b)

| | Permeability (m²) | (Cell hydraulic diameter)²/ Permeability | Pore diameter distribution (σ) | (Mp)/(Mc) | Purification rate (%) | Purification index (%) | Rise in pressure loss (%) | Long term clogging resistance |
|---|---|---|---|---|---|---|---|---|
| Example 1 | 3.09 × 10⁻¹¹ | 1.20 × 10⁵ | 0.3 | 12 | 95 | | | |
| Example 2 | 3.19 × 10⁻¹¹ | 1.31 × 10⁵ | 0.3 | 11 | 93 | | | |
| Example 3 | 3.29 × 10⁻¹¹ | 1.38 × 10⁵ | 0.3 | 9.5 | 88 | | | |
| Example 4 | 3.39 × 10⁻¹¹ | 1.41 × 10⁵ | 0.3 | 7 | 75 | | | |
| Example 5 | 3.59 × 10⁻¹¹ | 1.45 × 10⁵ | 0.3 | 5.5 | 57 | | | |
| Example 6 | 3.79 × 10⁻¹¹ | 1.51 × 10⁵ | 0.3 | 4.1 | 32 | | | |
| Example 7 | 1.10 × 10⁻¹¹ | 4.01 × 10⁵ | 0.55 | | | 200 | 5 | Excellent |
| Example 8 | 1.20 × 10⁻¹¹ | 3.68 × 10⁵ | 0.28 | | | 200 | 3 | Excellent |
| Example 9 | 1.55 × 10⁻¹¹ | 2.85 × 10⁵ | 0.5 | | | 230 | 3 | Excellent |
| Example 10 | 1.70 × 10⁻¹¹ | 2.59 × 10⁵ | 0.45 | | | 230 | 3 | Excellent |
| Example 11 | 0.95 × 10⁻¹¹ | 4.64 × 10⁵ | 0.55 | | | 180 | 15 | Good |

TABLE 1-continued

| | | | | | | | | |
|---|---|---|---|---|---|---|---|---|
| Example 12 | $8.60 \times 10^{-10}$ | $5.13 \times 10^5$ | 0.55 | | | 110 | 2 | Excellent |
| Comp. Ex. 1 | $3.80 \times 10^{-11}$ | $1.56 \times 10^5$ | 0.3 | 3.5 | 22 | | | |
| Comp. Ex. 2 | $3.92 \times 10^{-11}$ | $1.68 \times 10^5$ | 0.3 | 2 | 3 | | | |
| Comp. Ex. 3 | $4.01 \times 10^{-11}$ | $1.76 \times 10^5$ | 0.3 | 0.2 | 2 | | | |

The ratio of the whole length L to the equivalent diameter D (L/D) of each of the honeycomb catalyst body of Examples 13, 14 and Comparative Examples 4, 5 is shown in Table 2.

TABLE 2

| | | Cell density | | | Partition wall thickness | | Cell hydraulic diameter |
|---|---|---|---|---|---|---|---|
| | L/d | (cells/cm²) | (cpsi) | Cell pitch (mm) | (mm) | (mil) | (m) |
| Example 13 | 0.7 | 15.5 | 100 | 2.54 | 0.4318 | 17 | 0.0021 |
| Example 14 | 0.4 | 15.5 | 100 | 2.54 | 0.4318 | 17 | 0.0021 |
| Comp. Ex. 4 | 1 | 15.5 | 100 | 2.54 | 0.4318 | 17 | 0.0021 |
| Comp. Ex. 5 | 0.25 | 15.5 | 100 | 2.54 | 0.4318 | 17 | 0.0021 |

| | Average image maximum distance (μm) | Porosity (%) | Permeability (m²) | (Cell hydraulic diameter)²/ Permeability | Pore diameter distribution (σ) | Purification index (%) |
|---|---|---|---|---|---|---|
| Example 13 | 290 | 70 | $1.70 \times 10^{-11}$ | $2.59 \times 10^5$ | 0.45 | 230 |
| Example 14 | 290 | 70 | $1.70 \times 10^{-11}$ | $2.59 \times 10^5$ | 0.45 | 230 |
| Comp. Ex. 4 | 290 | 70 | $1.70 \times 10^{-11}$ | $2.59 \times 10^5$ | 0.45 | 150 |
| Comp. Ex. 5 | 290 | 70 | $1.70 \times 10^{-11}$ | $2.59 \times 10^5$ | 0.45 | 170 |

Further, each of the values (mercury pressure, pore diameter (D), and pore volume (f)) used for calculating "σ" of the honeycomb catalyst body of Example 8 is shown in Table 3.

TABLE 3

| Mercury pressure (psia) | Pore diameter (D) (μm) | Pore volume (f) (mL/g) | σ (s) |
|---|---|---|---|
| 0.06 | 300 | 0 | 0.279287 |
| 0.65 | 276.5613 | 0.0009 | |
| 0.96 | 188.5771 | 0.0058 | |
| 1.25 | 143.8456 | 0.0062 | |
| 1.54 | 116.8309 | 0.0067 | |
| 1.96 | 92.236 | 0.0114 | |
| 2.45 | 73.7034 | 0.0159 | |
| 3.04 | 59.3331 | 0.0242 | |
| 3.84 | 46.9749 | 0.0488 | |
| 4.84 | 37.3198 | 0.1247 | |
| 6.14 | 29.4055 | 0.1992 | |
| 7.82 | 23.0717 | 0.1588 | |
| 9.92 | 18.1951 | 0.0654 | |
| 12.51 | 14.4223 | 0.0172 | |
| 15.8 | 11.42 | 0.0031 | |
| 20.1 | 8.9799 | 0.0006 | |
| 23.49 | 7.6853 | 0.0002 | |
| 26.63 | 6.7786 | 0.0002 | |
| 28.19 | 6.4032 | 0.0001 | |
| 29.77 | 6.0628 | 0.0001 | |
| 33.76 | 5.3465 | 0.0001 | |
| 38.03 | 4.7461 | 0 | |
| 47.95 | 3.764 | 0 | |
| 61.36 | 2.9415 | 0 | |
| 77.49 | 2.3293 | 0 | |
| 97.71 | 1.8472 | 0 | |
| 198.36 | 0.9099 | 0 | |
| 821.77 | 0.2196 | 0 | |
| 3403.51 | 0.053 | 0.0013 | |
| 9956.08 | 0.0181 | 0.0104 | |

(Discussion)

As shown in Tables 1 and 2, the honeycomb catalyst bodies of Examples 1 to 14 each has high purification rate in comparison with honeycomb catalyst bodies of Comparative Examples 1 to 5 and shows excellent purification performance.

INDUSTRIAL APPLICABILITY

A honeycomb catalyst body of the present invention is excellent in purification efficiency, has low pressure loss, and is mountable even in a limited space. Therefore, a honeycomb catalyst body of the present invention can suitably be used for purifying target components contained in exhaust gas discharged from stationary engines for automobiles, construction machines, and industry; combustion apparatuses; and the like.

What is claimed is:

1. A honeycomb catalyst body comprising:
   porous partition walls having a large number of pores and disposed to form a plurality of cells communicating between two end faces,
   plugged portions disposed to plug each of the cells on one of the end faces, and
   catalyst layers loaded in layers on an inner surface of the cells and an inner surface of the pores and containing a noble metal,
   the porous partition walls having a large number of catalyst-carrying pores where gas can pass;
   wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(M_p)/(M_c) \geq 4$.

2. A honeycomb catalyst body according to claim 1, wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(M_p)/(M_c) \geqq 6$.

3. A honeycomb catalyst body according to claim 1, wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(M_p)/(M_c) \geqq 10$.

4. A honeycomb catalyst body according to claim 1, wherein the partition walls has a porosity of 55% or more in a state that the catalyst layer is loaded.

5. A honeycomb catalyst body according to claim 1, wherein the plugged portion has a porosity of 55% or more.

6. A honeycomb catalyst body according to claim 1, wherein a ratio (L/d) of a length (L) of the cells in the direction of communication to the equivalent diameter (d) is 0.3 or more and less than 0.75.

7. A honeycomb catalyst body according to claim 1, wherein a thickness of the partition walls is 0.3 to 0.43 mm, a cell density is 4 to 46.5 cells/cm², an average image maximum distance of the partition walls is 250 to 500 µm, and a porosity of the partition walls is 55 to 65%.

8. A honeycomb catalyst body according to claim 7, wherein the partition walls has a porosity of 60 to 80% and a common logarithm standard deviation (pore diameter distribution σ) of a pore diameter distribution in the partition walls is 0.2 to 0.6.

9. A honeycomb catalyst body according to claim 1, wherein an average image maximum distance of the partition walls is 250 to 3000 µm.

10. A method for manufacturing a honeycomb catalyst body using a honeycomb structure comprising:
   porous partition walls having a large number of pores and disposed to form a plurality of cells communicating between two end faces, and
   plugged portions disposed to plug each of the cells on one of the end faces;
   the method comprising the steps of:
   applying catalyst slurry containing a noble metal on the inner surface of the cells and the inner surface of the pores of the honeycomb structure with applying supersonic waves to form a layer of the catalyst slurry, and
   drying the slurry to load the catalyst layer containing the noble metal on the inner surface of the cells and inner surface of the pores and to form a large number of catalyst-carrying pores where gas can pass;
   wherein mass ($M_c$) of the noble metal contained in the catalyst layer loaded on the inner surface of the cells and mass ($M_p$) of the noble metal contained in the catalyst layer loaded on the inner surface of the pores satisfy the relation of $(M_p)/(M_c) \geqq 4$.

11. A method for manufacturing a honeycomb catalyst body according to claim 10, wherein the catalyst slurry is thixotropic.

* * * * *